(12) United States Patent
Yamaguchi et al.

(10) Patent No.: US 7,202,874 B2
(45) Date of Patent: Apr. 10, 2007

(54) METHOD FOR DRAWING OBJECT HAVING ROUGH MODEL AND DETAILED MODEL

(75) Inventors: Akihiro Yamaguchi, Tokyo (JP); Akihiko Yoshida, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 229 days.

(21) Appl. No.: 11/011,158

(22) Filed: Dec. 15, 2004

(65) Prior Publication Data

US 2005/0151732 A1      Jul. 14, 2005

(30) Foreign Application Priority Data

Dec. 16, 2003    (JP)    ............... 2003-418635

(51) Int. Cl.
*G06T 15/00*    (2006.01)
(52) U.S. Cl. .................. 345/589; 345/440; 703/7
(58) Field of Classification Search ............. 345/589, 345/419, 440; 703/7
See application file for complete search history.

(56) References Cited

U.S. PATENT DOCUMENTS

| | | | | |
|---|---|---|---|---|
| 5,572,634 | A | * | 11/1996 | Duluk, Jr. ................. 345/419 |
| 6,099,573 | A | * | 8/2000 | Xavier ........................ 703/7 |
| 6,674,432 | B2 | * | 1/2004 | Kennon et al. ............ 345/419 |
| 6,747,651 | B1 | * | 6/2004 | Tan et al. .................. 345/474 |

FOREIGN PATENT DOCUMENTS

| | | |
|---|---|---|
| JP | 2001-076180 | 3/2001 |
| JP | 2001-250128 | 9/2001 |
| JP | 2003-115055 | 4/2003 |
| JP | 2003-228725 | 8/2003 |

OTHER PUBLICATIONS

Hubbard, Collision Detection for Interactive Graphics Applications, IEEE, Sep. 1995; pp. 218-230.*

* cited by examiner

*Primary Examiner*—Phu K. Nguyen
(74) *Attorney, Agent, or Firm*—Greenblum & Bernstein, P.L.C.

(57) ABSTRACT

Detailed model data having numerous polygons and rough model data having fewer polygons are prepared for one object. A rectangular parallelepiped including the entire object is defined as a bounding box. A virtual three-dimensional space is perspective-transformed to divide an image-drawing field, which is an image drawing range, into a far image-drawing field and a near image-drawing field according to a distance from a viewpoint of virtual camera. When at least a part of the bounding box is included in the far image-drawing field, polygons of rough model data included in the far image-drawing field are drawn in a frame buffer. When at least a part of the bounding box is included in the near image-drawing field, polygons of detailed model data included in the near image-drawing field are drawn in a frame buffer.

25 Claims, 10 Drawing Sheets

FIG.3A
DETAILED MODEL DATA — 300
| POLYGON IDENTIFICATION NUMBER | —311 |
| VERTEX 1 IDENTIFICATION NUMBER |
| VERTEX 2 IDENTIFICATION NUMBER | 312
| VERTEX 3 IDENTIFICATION NUMBER |
| VERTEX 4 IDENTIFICATION NUMBER |
| POLYGON IDENTIFICATION NUMBER | —321
| VERTEX 1 IDENTIFICATION NUMBER |
| VERTEX 2 IDENTIFICATION NUMBER | 322
| VERTEX 3 IDENTIFICATION NUMBER |
| VERTEX 4 IDENTIFICATION NUMBER |
FIG.3B
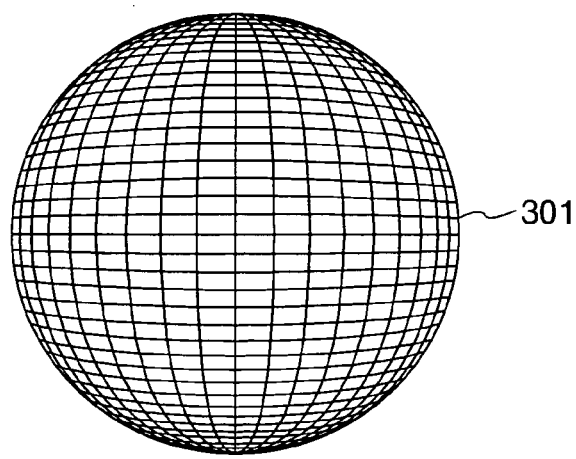
301
FIG.3C
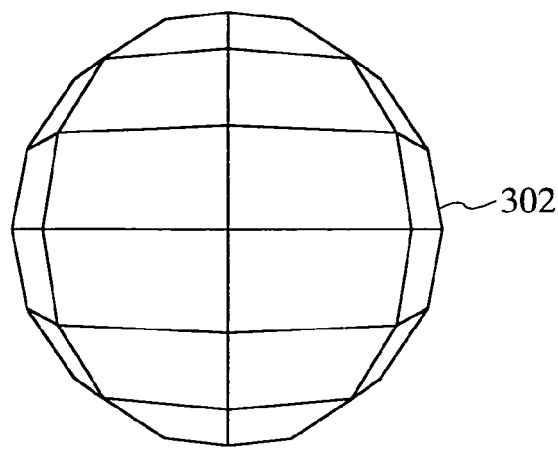
302

FIG.4A
DETAILED MODEL BOUNDING BOX 400
| VERTEX 1 IDENTIFICATION NUMBER | 411 |
| VERTEX 2 IDENTIFICATION NUMBER | 412 |
| VERTEX 3 IDENTIFICATION NUMBER | 413 |
| VERTEX 4 IDENTIFICATION NUMBER | 414 |
| VERTEX 5 IDENTIFICATION NUMBER | 415 |
| VERTEX 6 IDENTIFICATION NUMBER | 416 |
| VERTEX 7 IDENTIFICATION NUMBER | 417 |
| VERTEX 8 IDENTIFICATION NUMBER | 418 |
FIG.4B
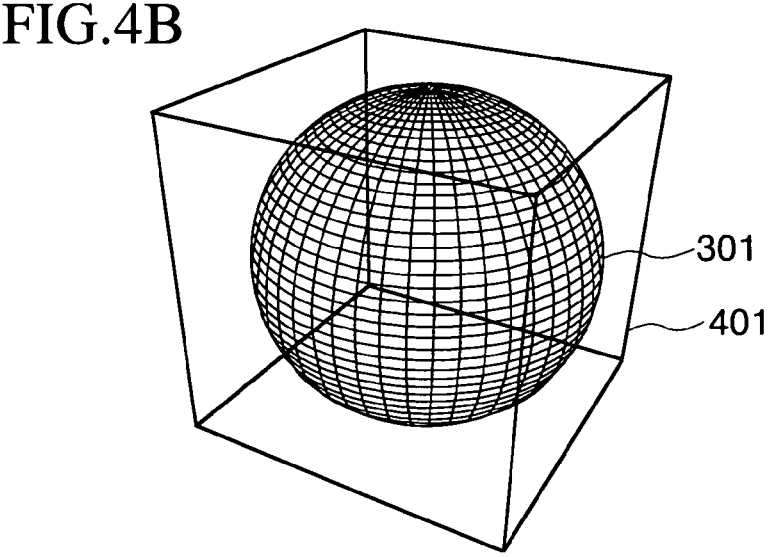
FIG.4C
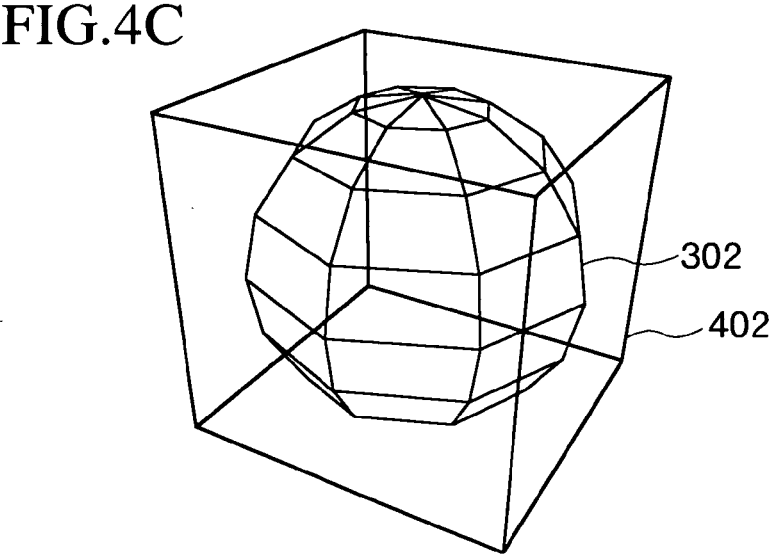

FIG.5

| VERTEX TABLE | EXAMPLE | |
|---|---|---|
| VERTEX IDENTIFICATION NUMBER | V1 | 511 |
| COORDINATE POSITION | (x1, y2, z3) | 512 |
| VERTEX IDENTIFICATION NUMBER | V2 | 521 |
| COORDINATE POSITION | (x2, y2, z2) | 522 |
| VERTEX IDENTIFICATION NUMBER | V3 | 531 |
| COORDINATE POSITION | (x3, y3, z3) | 532 |
| • | • | |
| • | • | |
| • | • | |

500

$$m = \begin{pmatrix} \dfrac{2*n}{r-l} & 0 & \dfrac{r+l}{r-l} & 0 \\ 0 & \dfrac{2*n}{t-b} & \dfrac{t+b}{t-b} & 0 \\ 0 & 0 & -\dfrac{f+n}{f-n} & -\dfrac{2fn}{f-n} \\ 0 & 0 & -1 & 0 \end{pmatrix}$$

METHOD FOR DRAWING OBJECT HAVING ROUGH MODEL AND DETAILED MODEL

CROSS REFERENCE TO RELATED APPLICATION

The present disclosure relates to subject matter contained in Japanese Patent Application No. 2003-418635, filed on Dec. 16, 2003, the disclosure of which is expressly incorporated herein by reference in its entirety.

BACKGROUND OF THE INVENTION

1. Field of the Invention

The present invention relates to an image processing technique for drawing an object having rough model data of multiple polygons and detailed model data of more polygons than the rough model data.

2. Description of the Related Art

Conventionally, in a video game, a virtual three-dimensional space is perspective-transformed onto a virtual screen from a predetermined viewpoint to draw an image of an object existing in the three-dimensional space. In order to display the progress of the game as a moving image, time in which one image must be drawn is limited to, for example, one frame period. For this reason, an amount of processing for drawing the image needs to be reduced. A Level Of Detail (LOD) technique is widely used to reduce the processing amount.

In the LOD technique, multiple model data, each having a different degree of detail for the same object (for example, a different number of polygons), is prepared. When a distance between a viewpoint and an object to be displayed is smaller than a predetermined threshold, an image of the object is drawn using detailed model data (for example, model data with a large number of polygons). When a distance between a viewpoint and an object to be displayed is larger than the predetermined threshold, an image of the object is drawn using rough model data (for example, model data with a small number of polygons).

According to the application of the LOD technique, an image of an object which is placed a short distance from the viewpoint can be displayed in detail using the detailed model data. An object which is placed a long distance from the viewpoint does not have to be displayed in detail, and an amount of processing for drawing the image can be limited by using the rough model data. For example, as shown in Unexamined Japanese Patent Publication No. 2003-115055, Unexamined Japanese Patent Publication No. 2003-228725, Unexamined Japanese Patent Publication No. 2001-250128, and Unexamined Japanese Patent Publication No. 2001-76180, a distance between a viewpoint and an object to be displayed is determined by a distance between a typical point, which is set at a central position of the object, and the viewpoint.

However, in the conventional LOD technique, when the distance between the typical point of the object and the viewpoint is larger than the threshold, an image of a part placed at a position much closer to the viewpoint is drawn using rough model data. When the distance between the typical point of the object and the viewpoint is smaller than the threshold, an image of a part placed at a position much farther from the viewpoint is drawn using detailed model data.

In the conventional LOD technique, when two or more such objects exist, there is a possibility that a part with a short distance from the viewpoint of one object will be drawn using rough model data, and that a part with a long distance from the viewpoint of the other object will be drawn using detailed model data. In this case, the position closer to the viewpoint is displayed roughly and the position farther from the viewpoint is displayed in detail. This gives an uncomfortable feeling to a player who watches the displayed image. Particularly, when multiple such objects exist close to each other, the player's discomfort increases.

SUMMARY OF THE INVENTION

An object of the present invention is to provide an image drawing apparatus that is capable of appropriately drawing an image of an object to be displayed while restraining an amount of processing required for drawing the image.

In order to attain the above object, an image drawing apparatus according to a first aspect of the present invention draws an object existing in a virtual three-dimensional space by perspective-transformation onto a virtual screen from a viewpoint of a virtual camera. The image drawing apparatus includes a rough model data storage that stores rough model data that forms the object by a predetermined multiple number of polygons, and a detailed model data storage that stores detailed model data that forms the object by more polygons than the predetermined number of polygons.

The image drawing apparatus further includes a field divider that divides an image-drawing field, which is an image drawing range in the virtual three-dimensional space, into a first field and a second field with reference to a position of the viewpoint. The image drawing apparatus further includes a first object determining section that determines whether at least a part of the object is included in the first field. The image drawing apparatus further includes a rough model drawer that draws an image obtained by perspective-transforming polygons of the rough model data of the part of the object included in the first field when at least a part of the object is included in the first field. The image drawing apparatus further includes a second object determining section that determines whether at least a part of the object is included in the second field. The image drawing apparatus further includes a detailed model determining section that determines whether each polygon of the detailed model data is included in the second field when at least a part of the object is included in the second field. The image drawing apparatus further includes a detailed model drawer that draws an image obtained by perspective-transforming the polygons of the detailed model data of the part of the object included in the second field.

In the above image drawing apparatus, the image-drawing field, which is the image drawing range in the virtual three-dimensional space, is divided into the first field and the second field. When even a part of the object is included in the first field, the image obtained by perspective-transforming the polygons of the rough model data is drawn. When even a part of the object is included in the second field, the image obtained by perspective-transforming the polygons of the detailed model data included in the second field is drawn.

The image drawn using detailed model data, which includes more polygons than the rough model data, is drawn in more detail than the image drawn using rough model data. The image of the part included in the first field in the object is relatively roughly drawn using rough model data. The image of the part included in the second field in the object is drawn in detail using detailed model data. In this way, since the degree of detail of the image to be drawn differs for each part of the object depending on the field in which the corresponding part is included, an appropriate image can be displayed on the display screen.

The image of the object whose entirety is included in the first field is drawn using only rough model data. The image of the object whose entirety is included in the second field is drawn using only detailed model data. In such a case, there is no need to determine in which field each polygon is included, so that the image can be drawn with a small amount of processing.

In order to attain the above object, an image drawing apparatus according to a second aspect of the present invention draws an object existing in a virtual three-dimensional space by perspective-transformation onto a virtual screen from a viewpoint of a virtual camera. The image drawing apparatus includes a program memory that stores a program, a data memory that stores data, and a processor that executes the program. The data memory includes a frame memory. The data memory stores rough model data that forms the object by a predetermined multiple number of polygons and detailed model data that forms the object by more polygons than the predetermined number of polygons.

The program causes the processor to divide an image-drawing field, which is an image drawing range in the virtual three-dimensional space, into a first field and a second field with reference to a position of the viewpoint. The program further causes the processor to determine whether at least a part of the object is included in the first field. The program further causes the processor to draw an image obtained by perspective-transforming polygons of the rough model data of the part of the object included in the first field when at least a part of the object is included in the first field.

The program further causes the processor to determine whether at least a part of the object is included in the second field. The program further causes the processor to determine whether each polygon of the detailed model data is included in the second field when at least a part of the object is included in the second field. The program further causes the processor to draw an image obtained by perspective-transforming the polygons of the detailed model data of the part of the object included in the second field.

The program stored in the program memory of the image drawing apparatus according to the second aspect of the present invention can be recorded on a computer-readable storage medium. The computer-readable storage medium may be a storage medium constructed to be movably loaded on the computer apparatus and provided separately from the computer apparatus. The computer-readable storage medium may be a storage medium such as a fixed disk device that is included in the computer apparatus and provided together with the computer apparatus. In the program stored in the program memory of the image drawing apparatus according to the second aspect of the present invention, the data signal can be superimposed on a carrier wave from a server apparatus existing on a network and the result is distributed via the network.

In order to attain the above object, an image drawing method according to a third aspect of the present invention draws an object, which exists in a virtual three-dimensional space and which has rough model data that forms the object by a predetermined multiple number of polygons and detailed model data that forms the object by more polygons than the predetermined number of polygons, by perspective-transformation onto a virtual screen from a viewpoint of a virtual camera.

The image drawing method divides an image-drawing field, which is an image drawing range in the virtual three-dimensional space, into a first field and a second field with reference to a position of the viewpoint. The image drawing method further determines whether at least a part of the object is included in the first field. The image drawing method further draws an image obtained by perspective-transforming polygons of the rough model data of the part of the object included in the first field when at least a part of the object is included in the first field.

The image drawing method further determines whether at least a part of the object is included in the second field. The image drawing method further determines whether each polygon of the detailed model data is included in the second field when at least a part of the object is included in the second field. The image drawing method further draws an image obtained by perspective-transforming the polygons of the detailed model data of the part of the object included in the second field.

BRIEF DESCRIPTION OF THE DRAWINGS

FIG. 3A is a view illustrating a configuration of a detailed model data table (or rough model data table);

FIG. 3B is a view illustrating an example of a detailed model;

FIG. 3C is a view illustrating an example of a rough model;

FIG. 4A is a view illustrating a configuration of a detailed model bounding box table (or rough model bounding box table);

FIG. 4B is a view illustrating an example of a detailed model bounding box;

FIG. 4C is a view illustrating an example of a rough model bounding box;

FIG. 5 is a view illustrating an example of a vertex table in which the respective vertexes of the detailed model data table (or rough model data table) and the respective vertexes of the detailed model bounding box table (or rough model bounding box table) are registered;

DETAILED DESCRIPTION OF PREFERRED EMBODIMENT

An embodiment of the present invention will be specifically described with reference to the drawings. The following explains an example in which the present invention is applied when an object having rough model data and detailed model data is drawn in a video game.

Figure 1:
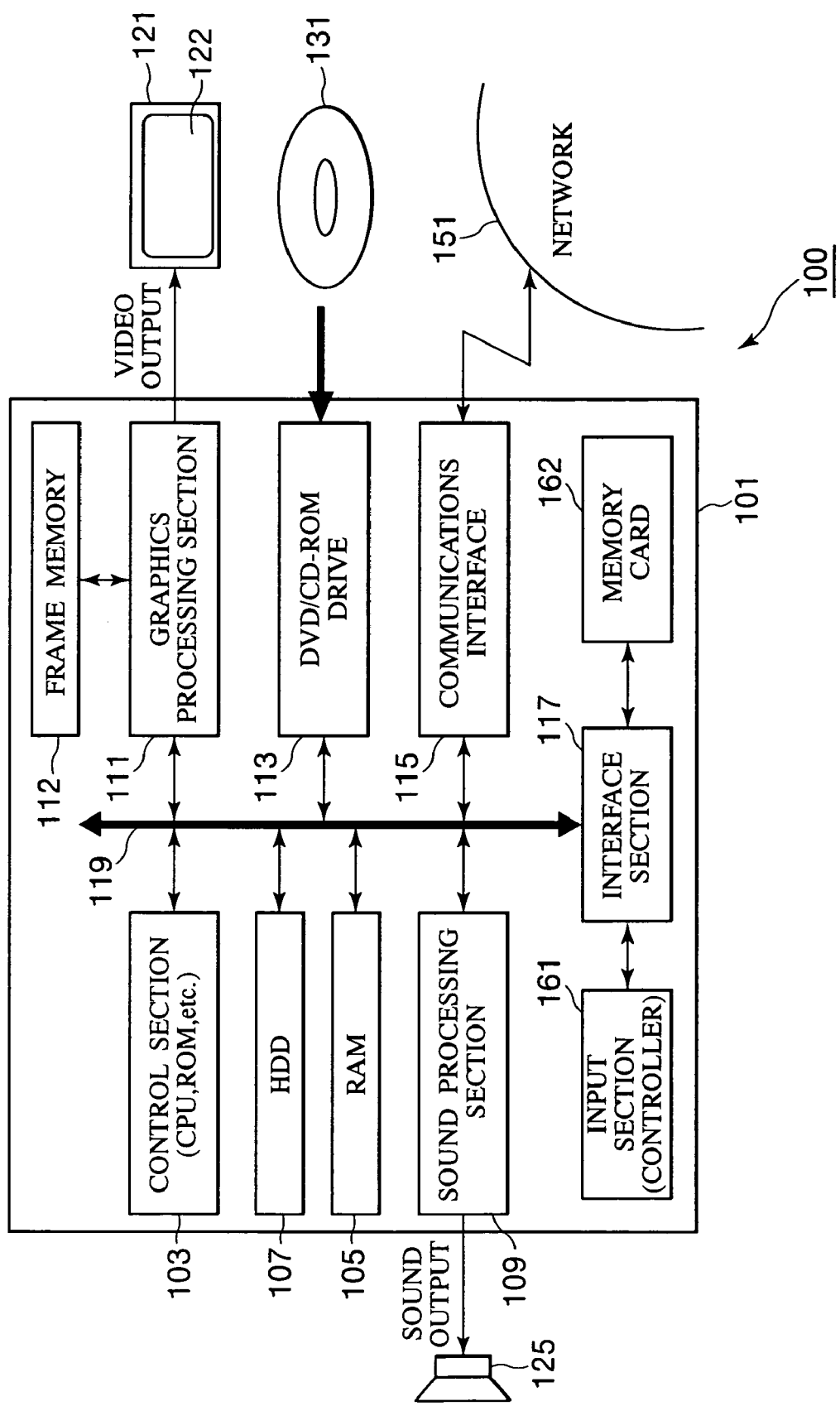
FIG. 1 is a block diagram illustrating a configuration of a video game apparatus according to an embodiment of the present invention.

FIG. 1 is a block diagram illustrating a configuration of a video game apparatus 100 for executing the video game according to an embodiment of the present invention. As illustrated in the figure, the video game apparatus 100 is mainly constructed to include a video game main body 101. The video game main body 101 includes a control section 103, a RAM (Random Access Memory) 105, a hard disk drive (HDD) 107, a sound processor 109, a graphics processor 111, a DVD/CD-ROM drive 113, a communications interface 115, and an interface section 117, each of which is connected to an internal bus 119.

The sound processor 109 is connected to a sound output device 125, which is a speaker. The graphics processor 111 is connected to a display device 121 having a display screen 122. A storage medium (DVD-ROM or CD-ROM in this embodiment) 131 can be attached to the DVD/CD-ROM drive 113. The communications interface 115 is connected to a network 151. An input section (controller) 161 and a memory card 162 are connected to the interface section 117.

The control section 103 includes a CPU (Central Processing Unit), a ROM (Read Only Memory), etc., and executes a program stored on the HDD 107 or the storage medium 131 to control the video game main body 101. The control section 103 has an internal timer. The RAM 105 is a work area for the control section 103. The HDD 107 is a storage area for storing a program and data. In the case where a program executed by the control section 103 instructs the sound processor 109 to output a sound, the sound processor 109 interprets the instruction and outputs a sound signal to the sound output device 125.

The graphics processor 111 develops an image onto the frame memory (frame buffer) 112 and outputs a video signal, which displays the image on the display screen 122 of the display device 121 according to a drawing command output from the control section 103. The frame memory 112 includes two units of frame memory. It is assumed that one frame period of the image included in outputting the video signal is, for example, 1/30 sec. The graphics processor 111 draws one image in one frame period (namely, 1/30 sec.). The DVD/CD-ROM drive 113 reads the program and data from the storage medium 131. The communications interface 115 is connected to the network (Internet 3) to perform communications with other computers.

The interface section 117 outputs input data sent from the input section 161 to the RAM 105. The control section 103 interprets the input data from the input section 161 to carry out arithmetic processing. The input section 161 includes a directional key and multiple operation buttons. The directional key is used to move a player character and a cursor in the game. Each operation button is used to instruct an operation of the player character and a decision of an item indicated by the cursor. The interface section 117 forwards data, indicative of the progress of the game stored in the RAM 105, to the memory card 162 based on the instruction from the control section 103. The interface section 117 reads data of the game at the time of interruption from the memory card 162 and transfers the read data to the RAM 105 based on the instruction from the control section 103.

The program and data for performing the game by the video game apparatus 100 are first stored on, for example, the storage medium 131. The program and data are read by the DVD/CD-ROM drive 113 and loaded onto the RAM 105 at the time of execution. The control section 103 processes the program and data loaded onto the RAM 105, outputs a drawing command to the graphics processor 111, and outputs an instruction of a sound output to the sound processor 109. Intermediate data is stored in the RAM 105 while the control section 103 performs processing.

In the video game according to this embodiment, an explanation is given of data prepared to draw and display an image of an object. Data prepared in advance includes an object table, a detailed model data table, a rough model data table, a detailed model bounding box table, a rough model bounding box table, and a vertex table. These tables are hereinafter referred to as a table group in some cases. Data of these tables are stored in the storage medium 131 or HDD 107, and retrieved to the RAM 105 as required.

In each object to be displayed in this video game, model data including multiple polygons is prepared. Each object has two kinds of model data, namely, rough model data and detailed model data. Though there is an object having only one kind of model data, such an object is not a target of the present invention and the explanation is omitted.

Figure 2:
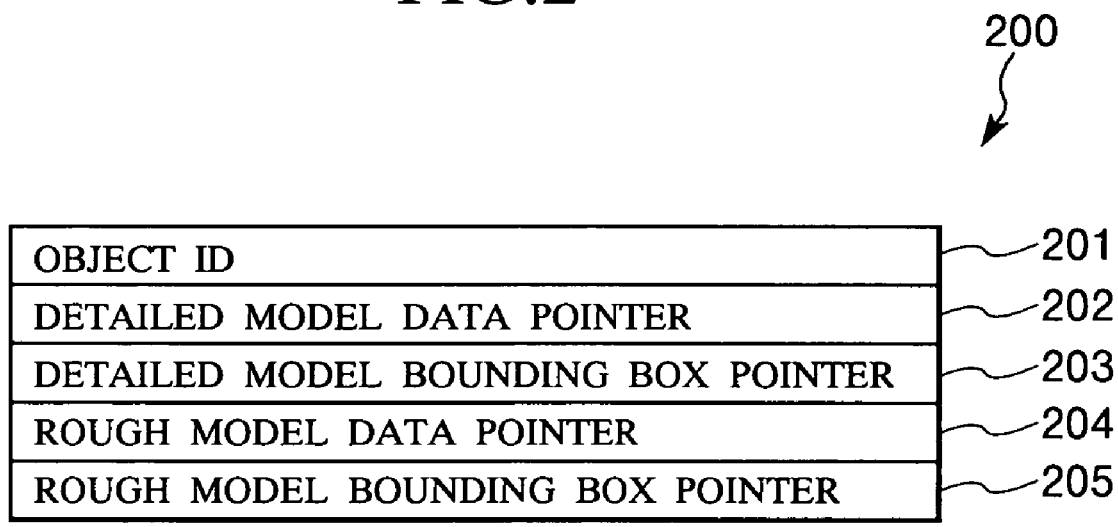
FIG. 2 is a view illustrating an example of an object table prepared for each object to be displayed.

FIG. 2 is a view illustrating an object table 200 prepared in connection with each object to be displayed. As illustrated in the figure, in the object table 200, an object ID 201, a detailed model data pointer 202, a detailed model bounding box pointer 203, a rough model data pointer 204, and a rough model bounding box pointer 205 are registered.

The object ID 201 is used to uniquely identify the object. The detailed model data pointer 202 is a pointer that refers to the detailed model data table in which detailed model data is registered. The detailed model bounding box pointer 203 is a pointer that refers to the detailed model bounding box table in which the detailed model bounding box is registered. The rough model data pointer 204 is a pointer that refers to the rough model table in which rough model data is registered. The rough model bounding box pointer 205 is a pointer that refers to the rough model bounding box table in which the rough model bounding box is registered.

FIG. 3A is a view illustrating the detailed model data table 300 shown by the detailed model data pointer 202. Regarding the rough model data table shown by the rough model data pointer 204, the basic configuration is the same as that of the detailed model data table 300 except that the number of registered polygons is smaller than that of the registered polygons registered in the detailed model data table 300. In the detailed model data table 300, polygon identification numbers 311, 321, . . . of the respective polygons that form the detailed model of the object and vertex identification numbers 312, 322, . . . of the respective polygons are registered.

The polygon identification numbers 311, 321, . . . are numbers for uniquely identifying the respective polygons that form the object. The vertex identification numbers 312, 322, . . . are numbers for uniquely identifying the vertexes of the respective polygons. The shapes of the polygons are triangles or squares. Regarding the triangle polygon, three vertex identification numbers are registered. Regarding the square polygon, four vertex identification numbers are registered. The coordinate positions of the vertexes of the respective polygons shown by the vertex identification numbers 312, 322 . . . are registered in a vertex table to be described later.

FIG. 3B is a view illustrating a detailed model 301 of a spherical object. The detailed model 301 is one in which the polygons registered in the detailed model table 300 are schematically shown. FIG. 3C is a view illustrating a rough model 302 of the same spherical object as that of FIG. 3B. The rough model 302 of FIG. 3C is one in which the polygons registered in the rough model data table are schematically shown. As is obvious from FIGS. 3B and 3C, the detailed model 301 includes the larger number of polygons than that of the rough model 302. Even if the detailed model 301 is largely displayed on a display screen 122, no unconformable feeling is given to the player.

FIG. 4A is a view illustrating a detailed model bounding box table 400 shown by the detailed model bounding box pointer 203. FIG. 4B is a detailed model bounding box 401 specified according to the detailed model box table 400. The detailed model bounding box 401 includes a rectangular parallelepiped that encloses the entirety of the detailed model 301 and has eight vertexes. In the detailed model bounding box table 400, vertex identification numbers 411 to 418 are registered to correspond to eight vertexes of the detailed model bounding box 401.

The configuration of the rough model bounding box table shown by the rough model bounding box pointer 205 is the same as that of the detailed model bounding box 400. FIG. 4C illustrates a rough model bounding box 402 shown by the rough model bounding box table. The rough model bounding box 402 includes a rectangular parallelepiped that encloses the entirety of the rough model 302 and has eight vertexes. In the rough model bounding box table, vertex identification numbers of eight vertexes of the rough model bounding box 402 are also registered.

FIG. 5 is a view illustrating a vertex table in which coordinate positions of the respective vertexes having registered vertex identification numbers are registered in the detailed model data table 300, the detailed model bounding box table 400, the rough model data table, and the rough model bounding box table. In a vertex table 500, vertex identification numbers 511, 521, 531, . . . and coordinate positions 512, 522, 532, . . . are registered to be associated with one another. The vertex identification numbers 511, 521, 531, . . . correspond to vertex identification numbers 312, 322, 411 to 418. The coordinate positions 512, 522, 532, . . . are coordinates of a local coordinate system of the corresponding object. The coordinate positions 512, 522, 532, . . . are transformed to coordinates of a world coordinate system, those of a viewpoint coordinate system, and further transformed to those of a perspective coordinate system (screen coordinate system) at the time of perspective-transformation.

Figure 6A:
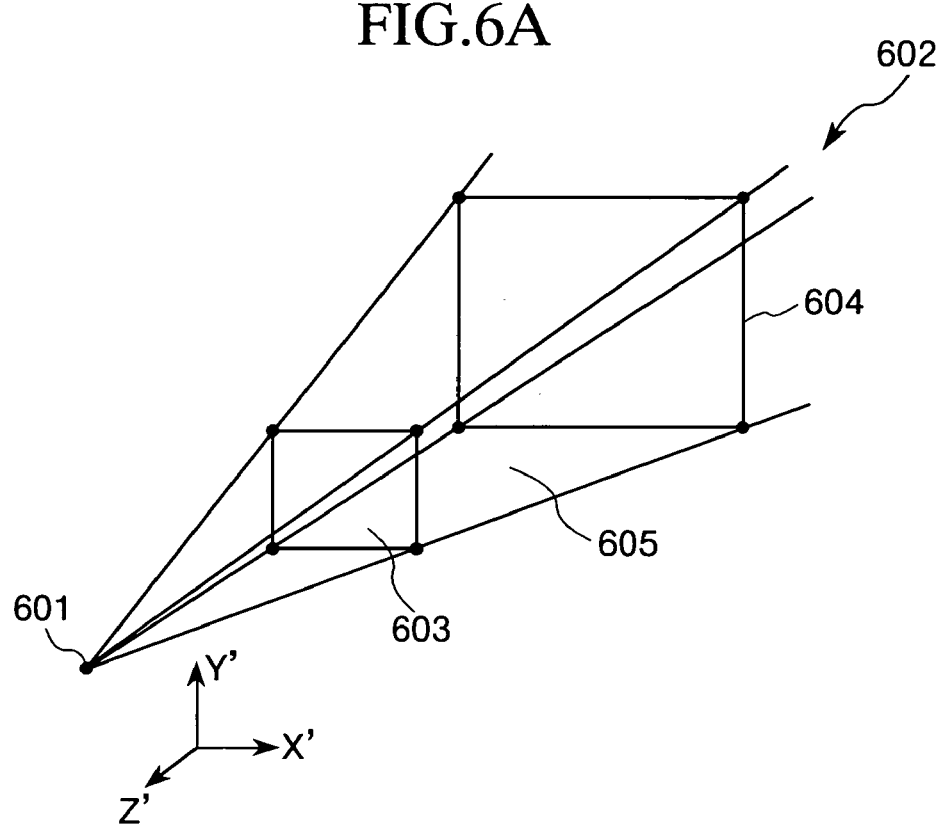
FIGS. 6A and 6B are views each explaining perspective-transformation in a video game according to an embodiment of the present invention.
Figure 6B:
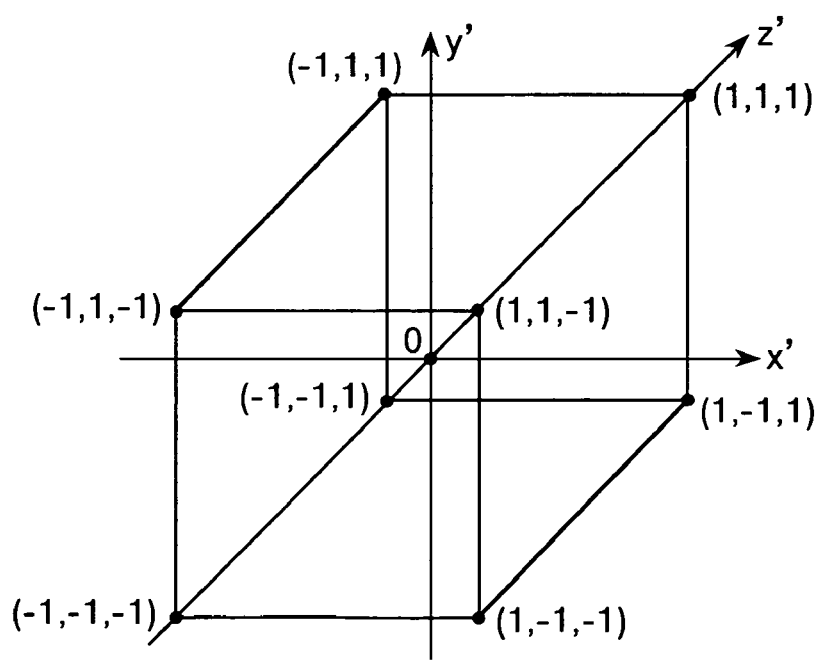

An explanation is given of a method for displaying an object existing in the virtual three-dimensional space on the display screen 122 in the video game according to this embodiment. The virtual three-dimensional space including an object to be displayed is perspective-transformed onto a virtual screen that is set according to a direction of a visual axis from a position of a viewpoint of a virtual camera, and a perspective-transformed image is displayed on the display screen 122. FIGS. 6A and 6B are views each schematically illustrating a state in which the virtual three-dimensional space is perspective-transformed.

As illustrated in FIG. 6A, a viewpoint 601 is set in the virtual three-dimensional space and a visual axis is set from a position of the viewpoint 601 to a predetermined direction (−Z'-axial direction). A virtual screen 603 is set at a position with a fixed short distance from the viewpoint 601 to the direction of the visual axis. A range of a square pole, which is formed by connecting the viewpoint 601 to four corners of the virtual screen 603, becomes a field of view 602. A surface, which is placed at a position with a fixed distance from the viewpoint 601 to the direction of the visual axis and perpendicular to a Z'-axis (whose Z' coordinate is the same) in the range of the field of view 602, is set as a limit surface 604. In the range of the field of view 602, the range between the limit surface 604 and the virtual screen 603 is fixed as an image-drawing field 605, which is a range where an image is drawn by perspective-transformation.

A coordinate system for projecting the virtual three-dimensional space on the virtual screen 603 is a viewpoint coordinate system (X', Y', Z') as illustrated in FIG. 6A. Coordinates (X, Y, Z) of a world coordinate system, which is a coordinate system set in the virtual three-dimensional space, is transformed to the viewpoint coordinate system (X', Y', Z') by a vector operation using a predetermine matrix. Transformation from the coordinates of the world coordinate system to the coordinates of the viewpoint coordinate system can be executed using the method that is conventionally applied in the field of the three-dimensional image processing. This is not directly related to the present invention and the specific explanation is omitted.

The coordinates (X', Y', Z') of the viewpoint coordinate system included in the range of the image-drawing field 605 shown in FIG. 6A is transformed to coordinates (x', y', z') of a normalized perspective coordinate system as shown in FIG. 6B. In the coordinates of the normalized perspective coordinate system, each of x' coordinate, y' coordinate, and z' coordinate enters in the range of the image-drawing field 605 if any of these coordinates is included in the range from −1 to +1. Though transformation to the coordinates (x', y', z') of the normalized perspective coordinate system from the coordinates (X', Y', Z') of the viewpoint coordinate system is also executed using the vector operation, a perspective-transformation matrix (to be described later) for executing the vector operation is set.

Coordinates of the local coordinate system of the respective vertexes of the detailed model, the rough model, the detailed model bounding box and the rough model bounding box registered in the vertex table 500 are transformed to the coordinates of the world coordinate system. The coordinates of the world coordinate system of the virtual three-dimensional space, which include the coordinates of the world coordinate system of the respective vertexes transformed from the coordinates of the local coordinate system, are transformed to the coordinates of the viewpoint coordinate system. The coordinates of the viewpoint coordinate system are further transformed to the coordinates of the normalized perspective coordinate system by the perspective-transformation matrix. It is assumed that the perspective-transformation in this embodiment includes the transformation to the normalized coordinates of the perspective coordinate system.

Figures 7, 8:
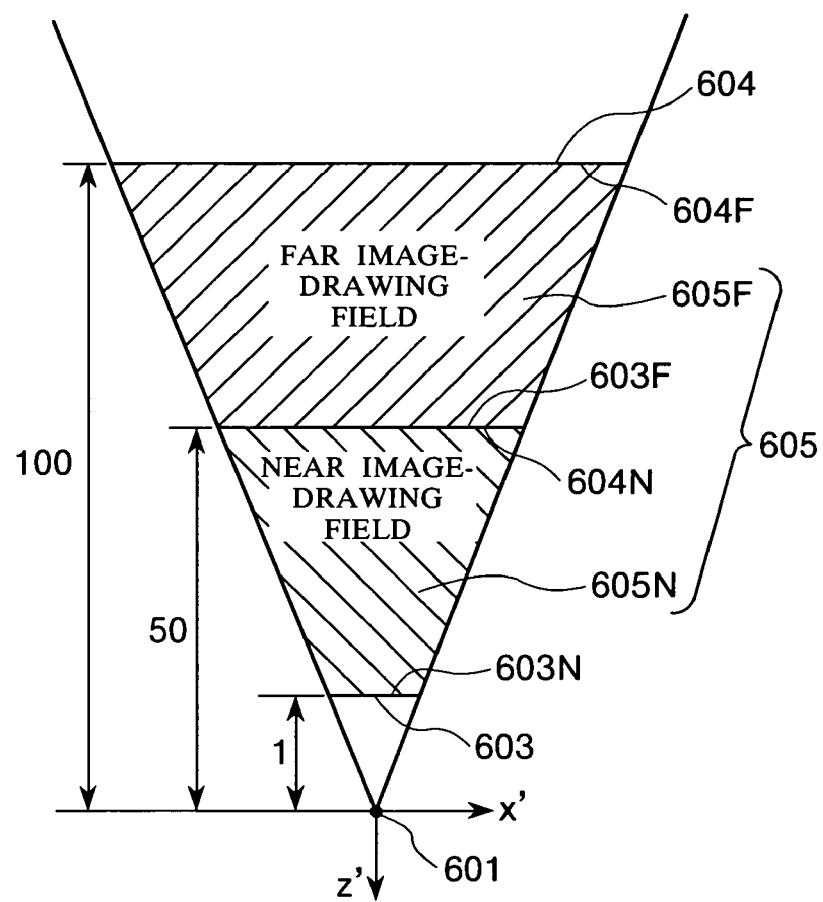
FIG. 7 is a view illustrating an example of a perspective-transformation matrix.
FIG. 8 is an explanatory view of a far image-drawing field and a near image-drawing field.

FIG. 7 is a view illustrating an example of the perspective-transformation matrix. The perspective-transformation matrix is a matrix of 4 rows and 4 columns. In the perspective-transformation matrix, l indicates an X' coordinate of a left end of a front clip surface (virtual screen), r indicates an X' coordinate of a right end of a front clip surface (virtual screen), t indicates a Y' coordinate of an upper end of a front clip surface (virtual screen), b indicates a Y' coordinate of a lower end of a front clip surface (virtual screen), n indicates a distance from the viewpoint 601 of a front clip surface (virtual screen), and f indicates a distance from the viewpoint 601 of an inner clip surface (limit surface). In the case where perspective-transformation is performed symmetrically with respect to a plane (Y'-Z' plane) where the X' coordinate through which the visual axis passes is 0, any of element values of the first row and third column, second row and third column, and third row and third column becomes 0.

In the video game according to this embodiment, the image-drawing field 605, which is the range where the image is drawn by perspective-transformation, is divided into a far image-drawing field and a near image-drawing field. In a part included in the far image-drawing field of the object to be displayed, an image is drawn using rough model data. In a part included in the near image-drawing field of the object to be displayed, an image is drawn using detailed model data.

FIG. 8 is an explanatory view of a far image-drawing field and a near image-drawing field. In the case where an image is drawn by perspective-transformation, in order to decide a drawing range of the image, the virtual screen 603 is set at a position with a fixed short distance (distance is 1 in this case) from the viewpoint 601, the limit surface 604 is set at a position with a fixed long distance (distance is 100 in this case) from the viewpoint 601, and the image-drawing field 605 is formed therebetween. According to this embodiment, a position of the predetermined distance from the viewpoint 601 (distance is 50 in this case) is set as a boundary position, so that the image-drawing field 605 is divided into a far image-drawing field 605F and a near image-drawing field 605N.

In the case where an object existing in the far image-drawing field 605F is perspective-transformed to draw an image, the boundary position is set as a virtual screen 603F in the far image-drawing field 605F and the original limit surface 604 is set as a limit surface 604F in the far image-drawing field 605F. A perspective-transformation matrix for a far image-drawing field is set according to the coordinates of the vertexes of four corners of the virtual screen 603F, a distance from the viewpoint 601 to the virtual screen 603F, and a distance from the viewpoint 601 to the limit surface 604F.

In the case where an object existing in the near image-drawing field 605N is perspective-transformed to draw an image, the original virtual screen 603 is set as a virtual screen 603N in the near image-drawing field 605N and the boundary position is set as a limit surface 604N in the near image-drawing field 605N. A perspective-transformation matrix for a near image-drawing field is set according to the coordinates of the vertexes of four corners of the virtual screen 603N, a distance from the viewpoint 601 to the virtual screen 603N, and a distance from the viewpoint 601 to the limit surface 604N.

The following explains processing in the video game according to this embodiment. In order to simplify the explanation, explanation of processing except processing relating to the present invention is sometimes omitted. It is assumed that processing of the control section 103 explained below sometimes includes processing executed by the graphics processor 111 based on an instruction from the control section 103.

Figure 9:
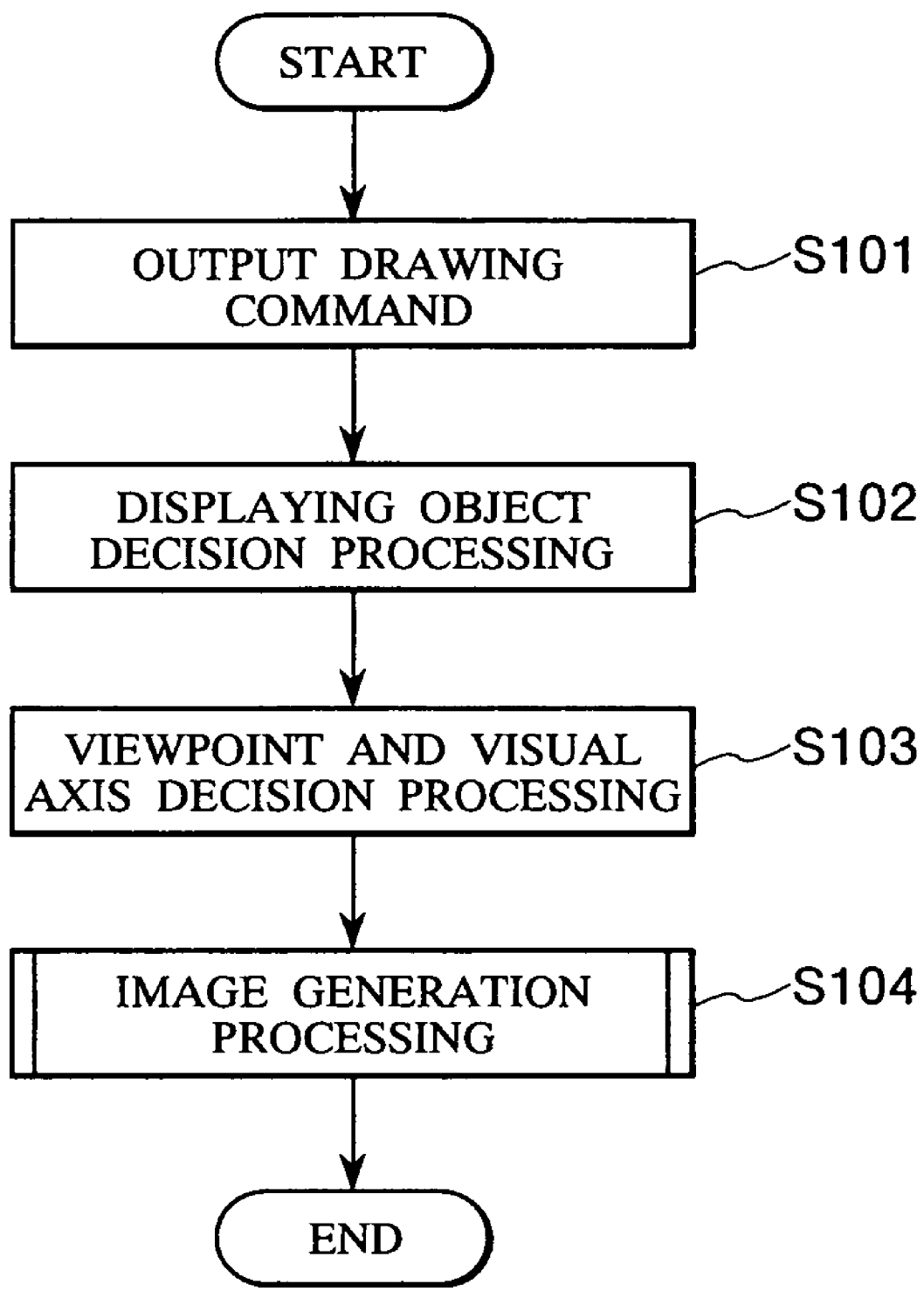
FIG. 9 is a flowchart illustrating processing executed for each frame period in order to draw and display an image of an object in a video game according to an embodiment of the present invention.

FIG. 9 is a flowchart illustrating processing executed for each frame period in order to draw and display an image of an object in a video game according to an embodiment of the present invention.

When a new frame time is started, the control section 103 outputs a drawing command to the graphics processor 111 (step S101). In response to the drawing command, the graphics processor 111 generates a video signal based on image data developed on one unit of frame memory 112 and outputs it to the display device 121. Accordingly, the image of the object drawn in the previous frame is displayed on the display screen.

The control section 103 performs displaying object decision processing for deciding an object to be displayed according to the progress of the game at the present time after outputting the drawing command (step S102). In the displaying object decision processing, the control section 103 stores a new displaying object in this frame period and the corresponding table group in the RAM 105. When the object is not to be used as the displaying object in this frame period, the corresponding table group is erased from the RAM 105. When there is an object whose display position is changed, the control section 103 updates the stored contents of the object to the changed contents.

The control section 103 performs viewpoint and visual axis decision processing and decides a position of the viewpoint 601 and a direction of the visual axis, which are used at the time of perspective-transformation, based on the position of the object stored as a displaying object (step S103). When the position of the viewpoint 601 and the direction of the visual axis are decided, the control section 103 performs image generation processing for perspective-transforming the virtual three-dimensional space including the displaying object from the position of the viewpoint 601 to draw the perspective-transformed image on the other unit of frame memory 112 (step S104). The details of the image generation processing are described later. Then, processing for one frame period is ended and the same processing is started for a next frame period.

Figure 10:
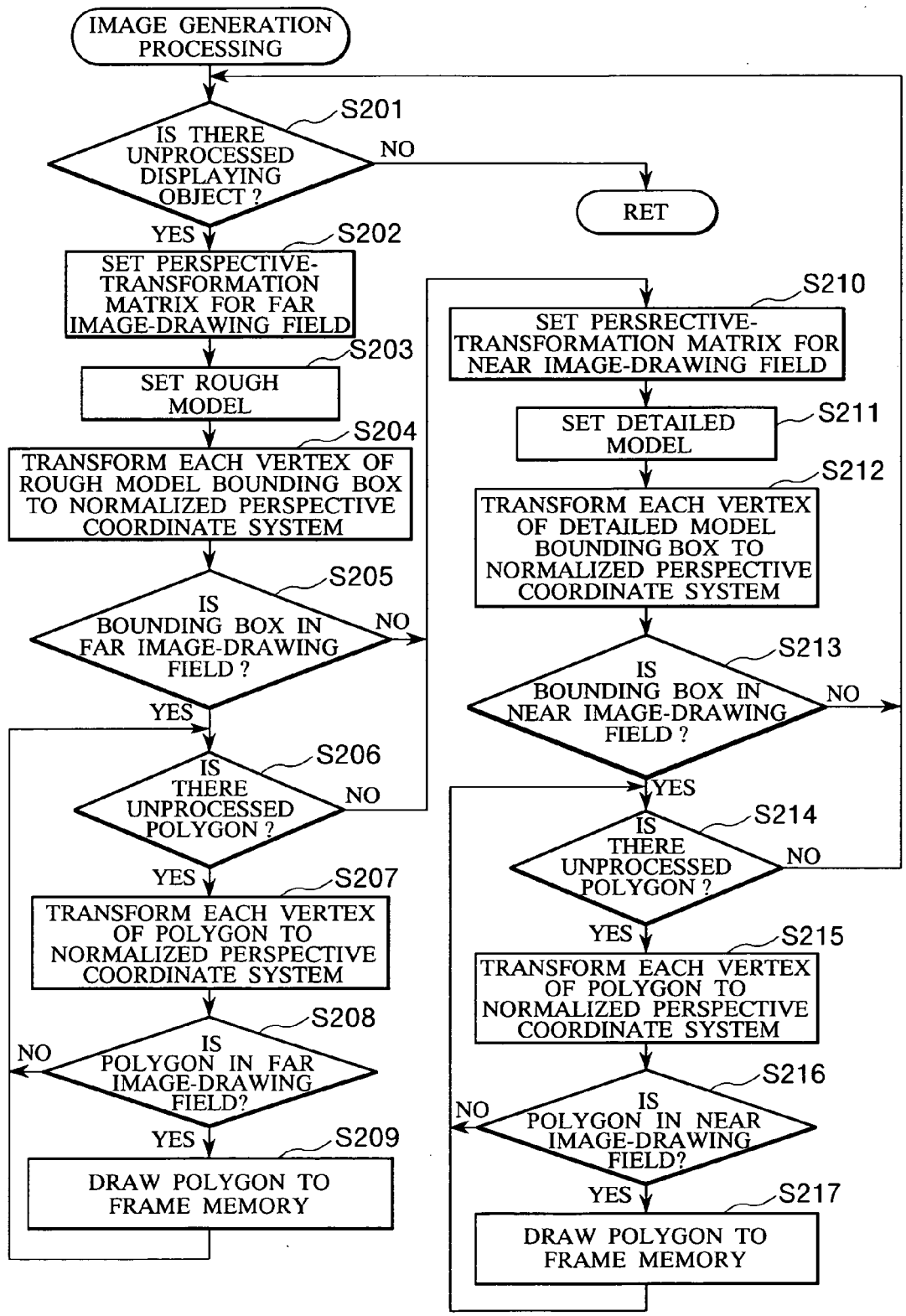
FIG. 10 is a flowchart specifically illustrating image generation processing of FIG. 9.

The image generation processing of the step S104 will be specifically explained. FIG. 10 is a flowchart specifically illustrating image generation processing of step S104. In the image generation processing, the objects as displaying objects stored in the RAM 105 are sequentially used as processing objects. However, the control section 103 determines whether there is an object that is not yet processed among the objects stored as the displaying objects (step S201).

When there is an object that is not yet processed, the control section 103 uses a new object as a processing object and sets a perspective-transformation matrix for a far image-drawing field 605 in a predetermined area of the RAM 105 according to the positions of the virtual screen 603F and the limit surface 604F in the far image-drawing field 605F (step S202). The control section 103 selects a rough model data table and a rough bounding box table and sets them in the RAM 105 in connection with the processing object (step S203).

The control section 103 perspective-transforms the rough model bounding box 402 registered in the rough bounding box table of the processing object and transforms coordinates of the respective vertexes to coordinates of the normalized perspective coordinate system (step S204). The control section 103 determines whether even a part of the rough model bounding box 402 is included in the far image-drawing field 605F, depending on whether there is at least one coordinate that is included in the far image-drawing field 605F among coordinates of the normalized perspective coordinate system of the vertexes of the rough model bounding box 402 (step S205). When there are vertexes where all of x'-coordinate, y'-coordinate and z'-coordinate of the perspective coordinate system are placed between −1 and +1, it is determined that the rough bounding box 402 is included in the far image-drawing field 605F. When the rough model bounding box 402 is not included in the far image-drawing field 605F, the processing directly proceeds to step S210.

When even a part of the rough model bounding box 402 is included in the far image-drawing field 605F, polygons registered in the rough model data table of the processing object are sequentially used as processing polygons. The control section 103 determines whether there is a polygon that is not yet processed among the polygons registered in the corresponding rough model data table (step S206). When there is no polygon that is not yet processed, the processing proceeds to step S210.

When there is a polygon that is not yet processed, the control section 103 perspective-transforms a new processing polygon and transforms coordinates of the respective vertexes to coordinates of the normalized perspective coordinate system (step S207). The control section 103 determines whether even a part of the processing polygon is included in the far image-drawing field 605F, depending on whether there is at least one coordinate that is included in the far image-drawing field 605F among coordinates of the normalized perspective coordinate system of the vertexes of the processing polygon (step S208). When there are vertexes where all of x'-coordinate, y'-coordinate and z'-coordinate of the perspective coordinate system are placed between −1 and +1, it is determined that the processing polygon is included in the far image-drawing field 605F. When the processing polygon is not included in the far image-drawing field 605F, the processing proceeds to step S206.

When even a part of the processing polygon is included in the far image-drawing field 605F, the control section 103 performs drawing processing for drawing an image, which is obtained by perspective-transforming the processing polygon, on the frame memory 112. In order to prevent the image of a polygon that is placed before the processing polygon from disappearing, the control section 103 performs hidden surface removal processing such as a Z-buffer method (step 209). Then, the processing returns to step S206.

In step S210, the control section 103 sets a perspective-transformation matrix for a near image-drawing field in a predetermined area of the RAM 105 according to the positions of the virtual screen 603N and the limit surface 604N in the near image-drawing field 605N. The control section 103 selects a detailed model data table 300 and a detailed model bounding box table 400 and sets them in the RAM 105 in connection with the processing object (step S211).

The control section 103 perspective-transforms the detailed model bounding box 401 registered in the detailed model bounding box table 400 of the processing object and transforms coordinates of the respective vertexes to coordinates of the normalized perspective coordinate system (step S212). The control section 103 determines whether even a part of the detailed model bounding box 401 is included in the near image-drawing field 605N, depending on whether there is at least one coordinate that is included in the far image-drawing field 605F among coordinates of the normalized perspective coordinate system of the vertexes of the detailed model bounding box 401 (step S213). When there are vertexes where all of x'-coordinate, y'-coordinate and z'-coordinate of the perspective coordinate system are placed between −1 and +1, it is determined that the detailed model bounding box 401 is included in the near image-drawing field 605N. When the detailed model bounding box 401 is not included in the near image-drawing field 605N, the processing directly returns to step S201.

When even a part of the detailed model bounding box 401 is included in the near image-drawing field 605N, polygons registered in the detailed model data table of the processing object are sequentially used as processing objects. The control section 103 determines whether there is a polygon that is not yet processed among the polygons registered in the corresponding detailed model data table (step S214). When there is no polygon that is not yet processed, the processing returns to step S201.

When there is a polygon that is not yet processed, the control section 103 perspective-transforms a new processing polygon and transforms coordinates of the respective vertexes to coordinates of the normalized perspective coordinate system (step S215). The control section 103 determines whether even a part of the processing polygon is included in the near image-drawing field 605N, depending on whether there is at least one coordinate that is included in the near image-drawing field 605N among coordinates of the normalized perspective coordinate system of the vertexes of the processing polygon (step S216). When there are vertexes where all of x'-coordinate, y'-coordinate and z'-coordinate of the perspective coordinate system are placed between −1 and +1, it is determined that the processing polygon is included in the near image-drawing field 605N. When the processing polygon is not included in the near image-drawing field 605N, the processing returns to step S214.

When even a part of the processing polygon is included in the near image-drawing field 605N, the control section 103 performs drawing processing for drawing an image, which is obtained by perspective-transforming the processing polygon, on the frame memory 112. In order to prevent the image of a polygon that is placed before the processing polygon from disappearing, the control section 103 performs hidden surface removal processing such as a Z-buffer method (step 217). Then, the processing returns to step S214.

When there is no object that is not yet processed among the objects registered as displaying objects in step S201, the control section 103 ends image generation processing and returns to the flowchart of FIG. 9.

The following explains specific display examples of the object in the video game according to this embodiment. An explanation is given of an example of change in an image that is displayed when one object moves in the virtual three-dimensional space and an example of an image displayed when two objects exist close to each other in the virtual three-dimensional space.

Figure 11A:
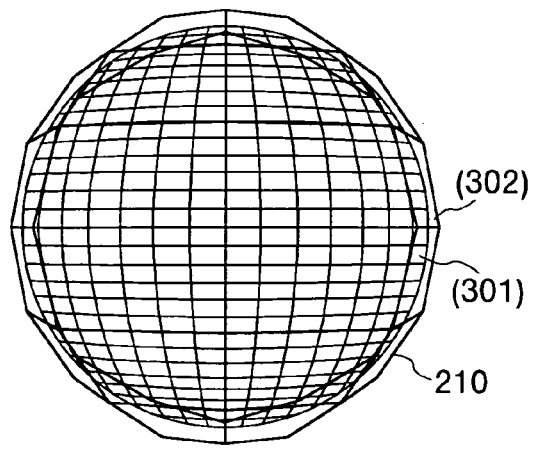
FIGS. 11A to 11D are views each illustrating an example of a display form of one object that moves in a virtual three-dimensional space.

FIGS. 11A to 11D are views each illustrating an example of a display form of one object that moves in the virtual three-dimensional space. In this example, an object 210 moves in the virtual three-dimensional space to go away from the position of the viewpoint 601. It is assumed that about $10/12$ of the diameter of the object 210 is included in the near image-drawing field 605N and the remaining part is included in the far image-drawing field 605F in a state before the object moves. In this state, as illustrated in FIG. 11A, the $10/12$ part included in the near image-drawing field 605N is drawn using the detailed model data 301 and the remaining part included in the far image-drawing field 605F is drawn using rough model data 302.

Figure 11C:
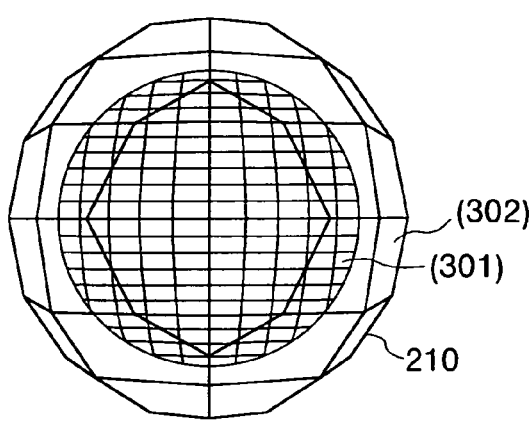
Figure 11B:
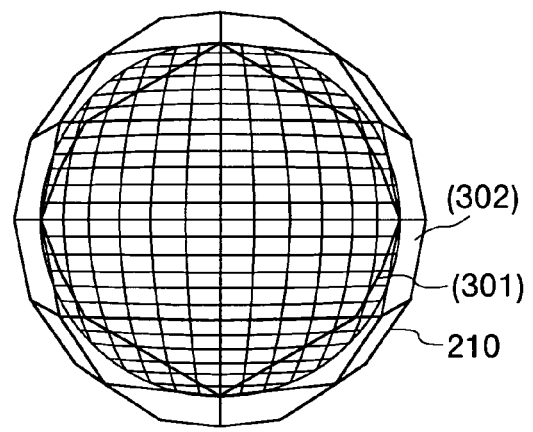

When the object 210 moves away from the viewpoint 601 by only $1/10$ of the diameter, about $9/12$ of the diameter of the object 210 is included in the near image-drawing field 605N and the remaining part is included in the far image-drawing field 605F. In this state, as illustrated in FIG. 11B, the $9/12$ part included in the near image-drawing field 605N is drawn using the detailed model data 301 and the remaining part included in the far image-drawing field 605F is drawn using rough model data 302. As a result, the amount of parts of the object 210 drawn using the detailed model data 301 is smaller than that of FIG. 11A.

When the object 210 further moves away from the viewpoint 601 by only $1/10$ of the diameter, about $8/12$ of the diameter of the object 210 is included in the near image-drawing field 605N and the remaining part is included in the far image-drawing field 605F. In this state, as illustrated in FIG. 11C, the $8/12$ part included in the near image-drawing field 605N is drawn using the detailed model data 301 and the remaining part included in the far image-drawing field 605F is drawn using rough model data 302. As a result, the amount of parts of the object 210 drawn using the detailed model data 301 is smaller than that of FIG. 1B.

Figure 11D:
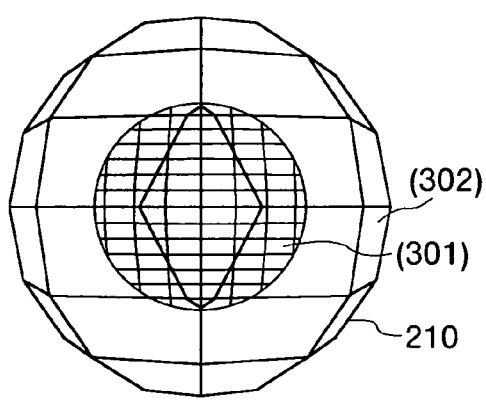

When the object 210 further moves away from the viewpoint 601 by only 1/10 of the diameter, about 7/12 of the diameter of the object 210 is included in the near image-drawing field 605N and the remaining part is included in the far image-drawing field 605F. In this state, as illustrated in FIG. 11D, the 7/12 part included in the near image-drawing field 605N is drawn using the detailed model data 301 and the remaining part included in the far image-drawing field 605F is drawn using rough model data 302. As a result, the amount of parts of the object 210 drawn using the detailed model data 301 is smaller than that of FIG. 11C.

Figure 12:
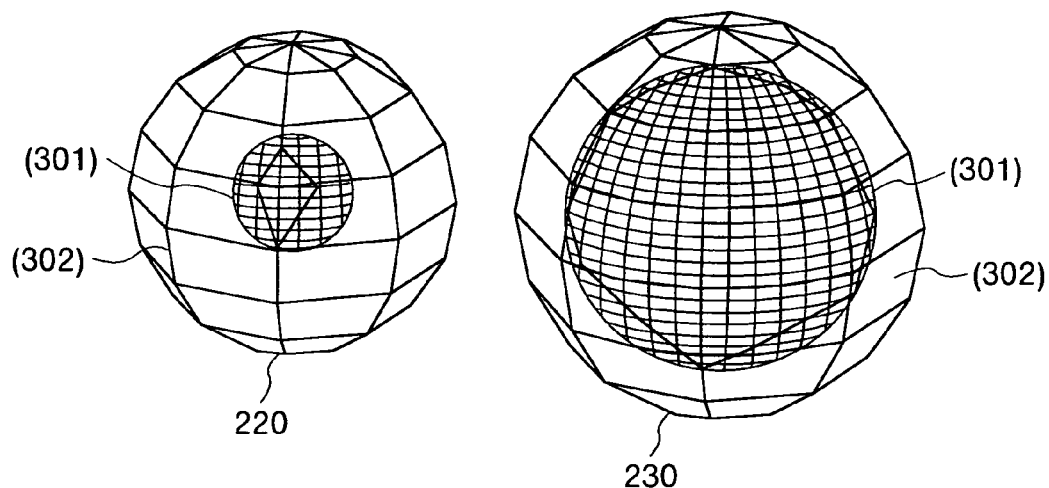
FIG. 12 is a view illustrating an example of a display form of two objects existing close to each other in a virtual three-dimensional space.

FIG. 12 is a view illustrating an example of a display form of two objects existing close to each other in a virtual three-dimensional space. Two objects 220 and 230 in this figure have the same shape and size, and are drawn using the same rough model data and detailed model data. The object 220 is placed at a farther position from the viewpoint 601 than the object 230, and the amount of parts of the object 220 included in the near image-drawing field 605N is smaller than that of the object 230 included in the near image-drawing field 605N.

As illustrated in FIG. 12, since the amount of parts of the object 220 included in the near image-drawing field 605N is relatively small, the amount of parts to be drawn using the detailed model data 301 is small and almost all parts are drawn using the rough model data 302. Since the amount of parts of the object 230 included in the near image-drawing field 605N is larger than that of the object 220, the amount of parts to be drawn using the detailed model data 301 is larger than that of the object 220 and the amount of parts to be drawn using the rough model data 302 is smaller than that of the object 220.

As explained above, in the video game according to this embodiment, two kinds of model data, namely, rough model data and detailed model data, each having a different degree of detail, are prepared to the respective objects existing in the virtual three-dimensional space. Detailed model data includes more polygons than rough model data and an image to be drawn using detailed model data is displayed on the display screen 122 in more detail than an image to be drawn using rough model data.

The image-drawing field 605, which is the range where the image is drawn by perspective-transformation, is divided into the far image-drawing field 605F and the near image-drawing field 605N according to the distance from the viewpoint 601. When even a part of the displaying object is included in the far image-drawing field 605F, the image of the part included in the far image-drawing field 605F of the object is drawn using the rough model data. When even a part of the displaying object is included in the near image-drawing field 605N, the image of the part included in the near image-drawing field 605N of the object is drawn using the detailed model data.

Accordingly, regardless of whether the central position of the object is included in the far image-drawing field 605F or the near image-drawing field 605N, the part included in the far image-drawing field 605F is drawn roughly and the part included in the near image-drawing field 605N is drawn in detail. An appropriate image is drawn for each part of the object. Since the degree of detail of the image to be drawn is different for each part of the object, the player, who sees two objects displayed on the display screen 122, does not feel uncomfortable even when the different two objects exist close to each other in the virtual three-dimensional space.

Since it is determined whether even a part of the object is included in the far image-drawing field 605F using the rough model bounding box 402 of the rectangular parallelepiped, the number of vertexes used in the determination is only 8. When 8 vertexes of the rough model bonding box 402 are not included in the far image-drawing field 605F, there is no need to determine whether the respective polygons that form rough model data 302 of the object are included in the far image-drawing field 605F. Also, since it is determined whether even a part of the object is included in the near image-drawing field 605N using the detailed model bounding box 401 of the rectangular parallelepiped, the number of vertexes used in the determination is only 8. When 8 vertexes of the detailed model bounding box 401 are not included in the near image-drawing field 605N, there is no need to determine whether the respective polygons that form detailed model data 301 of the object are included in the near image-drawing field 605N.

For this reason, even when the image of the object is drawn for each part according to the distance from the viewpoint 601, there is no case in which the amount of processing for drawing the image becomes excessive. Also, regarding the amount of processing for determining whether even a part of the object is included in each of the far image-drawing field 605F and the near image-drawing field 605N, the use of the bounding boxes 401 and 402 makes the amount of processing small.

Regarding even an object determined as being included in the far image-drawing field 605F by the rough model bounding box 402, only polygons of rough model data included in the far image-drawing field 605F are drawn. Also, regarding even an object determined as being included in the near image-drawing field 605N by the detailed model bounding box 401, only polygons of detailed model data included in the near image-drawing field 605N are drawn. Accordingly, there is no need to perform processing for drawing an image of a polygon that it is not necessary to display on the display screen 122, and there is no case in which the amount of processing for drawing the image is too large.

Whether each polygon that forms rough model data 302 is included in the far image-drawing field 605F is determined using all vertexes of the polygon. Among the polygons that form rough model data 302, such polygons where at least one of three or four vertexes is included in the far image-drawing field 605F are drawn. Also, whether each polygon that forms detailed model data 301 is included in the near image-drawing field 605N is determined using all vertexes of the polygon. Among the polygons that form detailed model data 301, such polygons where at least one of three or four vertexes is included in the near image-drawing field 605N are drawn. This makes it possible to avoid a disadvantage that the image of the object cannot be drawn at a portion in the vicinity of a boundary position between the far image-drawing field 605F and the near image-drawing field 605N.

Regarding the image of the object, after the part included in the far image-drawing field 605F is drawn using rough model data, the part included in the near image-drawing field 605N is drawn using detailed model data. This prevents the image drawn in detail, using detailed model data, from disappearing due to the rough image of rough model data. Accordingly, even if a polygon included in the far image-drawing field 605F and a polygon included in the near image-drawing field 605N overlap each other, a detailed image of the part included in the near image-drawing field 605N of the object can be drawn.

The bounding boxes 401 and 402 are prepared to detailed model data 301 and rough model data 302, respectively. The bounding boxes 401 and 402 can be set according to the shape and size in the detailed model data 301 and rough model data 302, respectively. For this reason, it is possible to reduce the number of cases in which the object is determined as being included in the far image-drawing field 605F though rough model data 302 is not included for a polygon included in the far image-drawing field 605F. It is also possible to reduce the number of cases in which the object is determined as being included in the near image-drawing field 605N though detailed model data 301 is not included for a polygon included in the near image-drawing field 605N. This increases the number of cases in which no determination is performed on whether the respective polygons (that form detailed model data 301 and rough model data 302) are included in the far image-drawing field 605F or the near image-drawing field 605N.

The present invention is not limited to the aforementioned embodiment, and various modifications and applications may be possible. The following explains modifications of the aforementioned embodiment to which the present invention can be applied.

In the aforementioned embodiment, different bounding boxes are prepared to detailed model data 301 and rough model data 302, respectively. In contrast to this, a bounding box common to detailed model data and rough model data may be prepared. In this case, it is possible to reduce a storage capacity necessary for a bounding box table. Regarding the detailed model data and rough model data of the same object, though there is a large difference in a degree of detail therebetween, no difference occurs in an outer side therebetween. Accordingly, even when the bounding box common to detailed model data and rough model data is used, there is little possibility that a disadvantage will occur in terms of the amount of processing.

The shape of the bounding box is not limited to the rectangular parallelepiped and any polyhedron can be used as long as the entirety of the corresponding object is included therein. For example, a bounding box applied to a spherical object may be a regular dodecahedron or a regular icosahedron. In accordance with an increase in the number of faces of the bounding box and the number of vertexes, the amount of processing for determining whether the object is included in the far image-drawing field 605F or the near image-drawing field 605N is increased. However, it is possible to reduce the cases in which the object is determined as being included in the far image-drawing field 605F or the near image-drawing field 605N though there are no polygons included in the far image-drawing field 605F or the near image-drawing field 605N. This makes it possible to reduce the amount of processing as a whole.

The shape of the bounding box may not be a polyhedron that is formed of planes, and the part or entirety may be formed of curved surfaces. For example, a sphere including the entirety of the corresponding object may be applied for a bounding box. In this case, the shape of the bounding box can be defined by a mathematical expression of a sphere having a predetermined radius where the entire object can be included about a typical point set at a substantially central position of the object. Whether even a part of the object is included in each of the far image-drawing field and the near image-drawing field can be determined by a calculation result using the mathematical expression of the bounding box and a mathematical expression that defines a boundary surface by which the image-drawing field is divided into the far image-drawing field and the near image-drawing field.

In the case where the number of polygons that form rough model data 402 is relatively small, it is possible to determine whether the object is included in the far image-drawing field 605F or the near image-drawing field 605N using rough model data 402. The rough model data 402 can serve as both the rough model bounding box and the detailed model bounding box. In this case, since there is no need to prepare the bounding box table in addition to the detailed model data table and the rough model data table, an amount of storage capacity necessary for storing data may be small.

In the aforementioned embodiment, it is determined whether the respective polygons that form detailed model data and rough model data are included in the far image-drawing field 605F or the near image-drawing field 605N by using the coordinate positions of all vertexes. In contrast to this, if the typical point of each polygon is set, it may be determined whether the respective polygons that form detailed model data and rough model data are included in the far image-drawing field 605F or the near image-drawing field 605N by using the coordinate position of the typical point. In this case, it is possible to reduce the amount of processing for determining whether each polygon is included in the far image-drawing field 605F or the near image-drawing field 605N. The coordinate position of the typical point of each polygon can be set to, for example, the position of its center of gravity.

In the aforementioned embodiment, the image-drawing field 605 that indicates the range where the perspective-transformation is performed in the virtual three-dimensional space is set symmetrically with respect to the visual axis. The image-drawing field 605 is divided into the far image-drawing field 605F and the near image-drawing field 605N according to the distance (z' coordinate of the perspective coordinate system) from the viewpoint 601. However, the method for dividing the image-drawing field 605 is not limited to this. The image-drawing field 605 may not be set symmetrically with respect to the Y'-Z' plane where the visual axis passes.

The boundary position at which the image-drawing field 605 is divided into the far image-drawing field 605F and the near image-drawing field 605N may be changed according to the kind of object. For example, in the case where an image of an object (for example, a player character), which has a high importance in the progress of the game, is drawn, the boundary position at which the image-drawing field 605 is divided into the far image-drawing field 605F and the near image-drawing field 605N may be set at a farther position from the viewpoint 601 than that set in the case where an image of the other object is drawn. This makes it possible to display the object with a high importance on the display screen 122 in more detail than the other object regardless of the distance from the viewpoint 601.

The boundary position at which the image-drawing field 605 is divided into the far image-drawing field 605F and the near image-drawing field 605N may be changed according to the progress of the game. In this case, since the degree of detail of the object on the display changes even if the position of the object does not change, a visual effect is caused on the image displayed on the display screen 122 according to the progress of the game. When the image-drawing field 605 is not set symmetrically with respect to the Y'-Z' plane, the boundary surface between the far image-drawing field 605F and the near image-drawing field 605N may not be perpendicular to the visual axis.

When the player character is included as a displaying object, the progress of the game can be determined by a change in a parameter that the player character has. For example, when a value of HP (Hit Point: a remaining value of damage that the player character can receive) of the player character is high at a battle with an enemy character, the boundary surface, which divides the image dividing field into the far image-drawing field 605F and the near image-drawing field 605N, can be set to a position relatively close to the viewpoint 601 and when the value of HP is low, the boundary position can be set to a position relative far from the viewpoint 601.

In the aforementioned embodiment, two kinds of model data, namely, detailed model data and rough model data are prepared to one object. However, three or more kinds of model data each having a different degree of detail may be prepared to one object. In this case, the image-drawing field 605 can be divided according to the prepared number of kinds of model data. For example, the following considers a case in which three kinds of model data, which include rough model data formed of a predetermined number of polygons, normal model data whose number of polygons is larger than that of rough model data, and detailed model data whose number of polygons is larger than that of normal model data, are prepared to one object.

In this case, the image-drawing field 605 can be divided into three image-drawing fields, namely, a far image-drawing field, an intermediate image-drawing field, and a near image-drawing field in descending order of distance from the viewpoint 601. In the case where even a part of the object is included in the far image-drawing field, polygons of rough model data included in the far image-drawing field are drawn. In the case where even a part of the object is included in the intermediate image-drawing field, polygons of normal model data included in the intermediate image-drawing field are drawn. In the case where even a part of the object is included in the near image-drawing field, polygons of detailed model data included in the near image-drawing field are drawn.

In the aforementioned embodiment, in the case where the displaying object is included in both the far image-drawing field 605F and the near image-drawing field 605N, after polygons of rough model data included in the far image-drawing field 605F are drawn, polygons of detailed model data included in the near image-drawing field 605N are drawn.

When all polygons of rough model data are drawn, the images developed on the frame memory 112 are rough. However, if there is at least one polygon of detailed model data at the same position, the frame memory 112 is rewritten by the polygon of detailed model data, so that the part included in the near image-drawing field 605N of the object is displayed in detail on the display screen 122. In the case where all polygons of rough model data are drawn, there is no need to determine whether the object is included in the far image-drawing field 605F and the rough model bounding box is not needed.

In the aforementioned embodiment, when the number of displaying objects is multiple, image drawing using rough model data and image drawing using detailed model data are sequentially performed to one object, and thereafter image drawing using rough model data and image drawing using detailed model data are sequentially performed to a next object. In contrast to this, if the boundary positions between the far image-drawing field 605F and the near image-drawing field 605N, which are applied to the multiple objects, are the same, image drawing using rough model data is sequentially performed to the multiple displaying objects, and thereafter image drawing using detailed model data may be sequentially performed to the multiple displaying objects.

In this case, even when different objects overlap each other complicatedly in connection with the image projected on the virtual screen, the following disadvantage is not caused. Namely, a problem has been known when the image of a polygon of detailed model data existing in the vicinity of the boundary position in connection with one object disappears due to the image of a polygon of rough model data existing in the vicinity of the boundary position in connection with the other object.

In the aforementioned embodiment, the video game apparatus 100, which is a special-purpose machine, is used as a platform. In contrast to this, any apparatus such as a general-purpose computer may be used if the apparatus includes the same structural components as those of the video game main body 101 and a function of drawing an image. Moreover, a portable video game apparatus, which contains the display device 121 and the sound output device 125 in the same cabinet as that of the video game main body 101, may also be used.

In the aforementioned embodiment, the program and data of the video game apparatus 100 are stored in the storage medium 131 and distributed. A semiconductor memory card can be used as the storage medium 131 in place of a DVD-ROM or CD-ROM. In this case, the computer apparatus applied as a platform must include a card slot for inserting the memory card may be formed in place of the DVD/CD-ROM drive 113. The program and data relating to the present invention may be prestored in the HDD 107. Regarding the storage medium for storing the program and data relating to the present invention, any storage medium may be used according to the physical form of hardware and the distribution thereof.

The programs and data relating to the present invention may be stored on a fixed disk apparatus provided in a Web server. The Web server may convert the program and data stored in the fixed disk apparatus to a signal and superimpose the signal on a carrier wave, and distribute it to the video game main body 101 via the network 151. For example, the program and data, which the communications interface 115 receives from the Web server, can be stored in the HDD 107 and loaded to the RAM 105 at an executing time.

In the aforementioned embodiment, the explanation is given of the case in which the present invention is applied to the video game in which the object having rough model data and detailed model data is moved in the three-dimensional space to progress the game. The applicable range of the present invention is not limited to the video game. The present invention can be used in the general field of the computer graphics processing for drawing an image of the object having rough model data and detailed model data. A program including a function of drawing an image of the object having rough model data and detailed model data can be distributed by the aforementioned various kinds of methods as mentioned above regardless of the fact that the program is applied as a part of the video game.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. An image drawing apparatus that draws an object existing in a virtual three-dimensional space by perspective-transformation onto a virtual screen from a viewpoint of a virtual camera, comprising:
   a rough model data storage that stores rough model data that forms the object by a predetermined number of polygons;
   a detailed model data storage that stores detailed model data that forms the object by more polygons than the predetermined number of polygons;
   a field divider that divides an image-drawing field, which is an image drawing range in the virtual three-dimensional space, into a first field and a second field with reference to a position of the viewpoint, the first field and the second field being divided at a boundary position;
   a first object determining section that determines whether at least a part of the object is included in the first field;
   a rough model drawer that draws an image obtained by perspective-transforming polygons of the rough model data of the part of the object included in the first field when at least a part of the object is included in the first field;
   a second object determining section that determines whether at least a part of the object is included in the second field;
   a detailed model determining section that determines whether each polygon of the detailed model data is included in the second field when at least a part of the object is included in the second field; and
   a detailed model drawer that draws an image obtained by perspective-transforming the polygons of the detailed model data of the part of the object included in the second field.

2. The image drawing apparatus according to claim 1, wherein said field divider divides the image-drawing field in such a way that a range with more than a predetermined distance from the position of the viewpoint is set as the first field and a range with less than a predetermined distance from the position of the viewpoint is set as the second field.

3. The image drawing apparatus according to claim 1, further comprising a drawing controller that causes said detailed model drawer to draw an image after the image is drawn by said rough model drawer.

4. The image drawing apparatus according to claim 1, wherein said rough model drawer draws an image obtained by perspective-transforming all polygons of the rough model data when at least a part of the object is included in the first field.

5. The image drawing apparatus according to claim 1, wherein said detailed model determining section determines that a polygon is included in the second field when at least one vertex of the polygon is included in the second field.

6. The image drawing apparatus according to claim 1,
   wherein a typical point is set within a range of each polygon of the detailed model data; and
   wherein said detailed model determining section determines that a polygon of the detailed model data is included in the second field when the typical point of the polygon is included in the second field.

7. The image drawing apparatus according to claim 1, further comprising:
   a rough model determining section that determines whether each polygon of the rough model data is included in the first field when at least a part of the object is included in the first field;
   wherein said rough model drawer draws an image of polygons included in the first field.

8. The image drawing apparatus according to claim 1, wherein said rough model determining section determines that a polygon is included in the first field when at least one vertex of the polygon is included in the first field.

9. The image drawing apparatus according to claim 1,
   wherein a typical point is set within a range of each polygon of the rough model data; and
   wherein when the typical point of a polygon of the rough model data is included in the first field, said rough model determining section determines that the polygon of the rough model data is included in the first field.

10. The image drawing apparatus according to claim 1, further comprising:
    a bounding box storage that stores a bounding box that fixes the number of vertexes, which is not more than the number of vertexes fixed by the polygon of the rough model data, and includes the object in a range of a polyhedron defined by the vertexes;
    wherein said first object determining section determines whether each vertex of the bounding box is included in the first field to determine whether at least a part of the object is included in the first field; and
    wherein said second object determining section determines whether each vertex of the bounding box is included in the second field to determine whether at least a part of the object is included in the second field.

11. The image drawing apparatus according to claim 10,
    wherein said bounding box storage stores a rough model bounding box corresponding to the rough model data and a detailed model bounding box corresponding to the detailed model data;
    wherein said first object determining section determines whether each vertex of the rough model bounding box is included in the first field to determine whether at least a part of the object is included in the first field; and
    wherein said second object determining section determines whether each vertex of the detailed model bounding box is included in the second field to determine whether at least a part of the object is included in the second field.

12. The image drawing apparatus according to claim 11, wherein said bounding box storage stores the rough model data as the detailed model bounding box.

13. The image drawing apparatus according to claim 1, further comprising:
    a bounding box storage that stores a bounding box that is defined by a mathematical expression with reference to a typical point fixed within a range of the object and includes the object within the range defined by the mathematical expression;
    wherein said first object determining section determines whether at least a part of the object is included in the first field according to a mathematical expression that defines the bounding box and a mathematical expression that defines a boundary surface between the first field and the second field; and
    wherein said second object determining section determines whether at least a part of the object is included in the second field according to a mathematical expression that defines the bounding box and a mathematical expression that defines the boundary surface.

14. The image drawing apparatus according to claim 13, wherein said bounding box storage stores a rough model bounding box corresponding to the rough model data and a detailed model bounding box corresponding to the detailed model data.

15. The image drawing apparatus according to claim 1, wherein the object comprises multiple objects; and
wherein said image drawing apparatus further comprises a processing controller that causes sequential processing by said first object determining section, said rough model drawer, said second object determining section, said detailed model determining section and said detailed model drawer in connection with sequential objects of the multiple objects as processing objects.

16. The image drawing apparatus according to claim 1, wherein the object comprises multiple objects; and
wherein said image drawing apparatus further comprises a processing controller section that causes processing of said second object determining section, said detailed model determining section and said detailed model drawer to be executed in connection with all of the multiple objects after causing processing of said first object determining section and said rough model drawer to be executed in connection with all of the multiple objects.

17. An image drawing apparatus that draws an object existing in a virtual three-dimensional space by perspective-transformation onto a virtual screen from a viewpoint of a virtual camera, comprising:
a rough model data storage that stores rough model data that forms the object by a predetermined number of polygons;
a detailed model data storage that stores detailed model data that forms the object by more polygons than the predetermined number of polygons;
a field divider that divides an image-drawing field, which is an image drawing range in the virtual three-dimensional space, into a first field and a second field with reference to a position of the viewpoint;
a first object determining section that determines whether at least a part of the object is included in the first field;
a rough model drawer that draws an image obtained by perspective-transforming polygons of the rough model data of the part of the object included in the first field when at least a part of the object is included in the first field;
a second object determining section that determines whether at least a part of the object is included in the second field;
a detailed model determining section that determines whether each polygon of the detailed model data is included in the second field when at least a part of the object is included in the second field; and
a detailed model drawer that draws an image obtained by perspective-transforming the polygons of the detailed model data of the part of the object included in the second field,
wherein the object comprises multiple objects; and
wherein said field divider divides the image-drawing field into the first field and the second field at a boundary position that is different for each of the multiple objects.

18. An image drawing apparatus that draws an object existing in a virtual three-dimensional space by perspective-transformation onto a virtual screen from a viewpoint of a virtual camera, comprising:
a rough model data storage that stores rough model data that forms the object by a predetermined number of polygons;
a detailed model data storage that stores detailed model data that forms the object by more polygons than the predetermined number of polygons;
a field divider that divides an image-drawing field, which is an image drawing range in the virtual three-dimensional space, into a first field and a second field with reference to a position of the viewpoint;
a first object determining section that determines whether at least a part of the object is included in the first field;
a rough model drawer that draws an image obtained by perspective-transforming polygons of the rough model data of the part of the object included in the first field when at least a part of the object is included in the first field;
a second object determining section that determines whether at least a part of the object is included in the second field;
a detailed model determining section that determines whether each polygon of the detailed model data is included in the second field when at least a part of the object is included in the second field;
a detailed model drawer that draws an image obtained by perspective-transforming the polygons of the detailed model data of the part of the object included in the second field; and
a game progress determining section that determines a progress of a game;
wherein said field divider divides the image-drawing field into the first field and the second field at a boundary position that is different according to the progress of the game.

19. An image drawing apparatus that draws an object existing in a virtual three-dimensional space by perspective-transformation onto a virtual screen from a viewpoint of a virtual camera, comprising:
a program memory that stores a program; a data memory that stores data; and a processor that executes the program;
wherein said data memory includes a frame memory and stores rough model data that forms the object by a predetermined number of polygons and detailed model data that forms the object by more polygons than the predetermined number of polygons;
wherein the program causes said processor to execute:
dividing an image-drawing field, which is an image drawing range in the virtual three-dimensional space, into a first field and a second field with reference to a position of the viewpoint, the first field and the second field being divided at a boundary position;
determining whether at least a part of the object is included in the first field;
drawing an image obtained by perspective-transforming polygons of the rough model data of the part of the object included in the first field when at least a part of the object is included in the first field;
determining whether at least a part of the object is included in the second field;
determining whether each polygon of the detailed model data is included in the second field when at least a part of the object is included in the second field; and drawing an image obtained by perspective-transforming the polygons of the detailed model data of the part of the object included in the second field.

20. The image drawing apparatus according to claim 19, wherein the program causes said processor to execute:
drawing an image obtained by perspective-transforming the polygons of the detailed model data after drawing an image obtained by perspective-transforming the polygons of the rough model data.

21. The image drawing apparatus according to claim 19, wherein the program causes said processor to execute:
determining whether each polygon of the rough model data is included in the first field when at least a part of the object is included in the first field; and
drawing an image of the polygons of the rough model data included in the first field.

22. The image drawing apparatus according to claim 19, wherein said data memory further stores a bounding box that fixes the number of vertexes, which is not more than the number of vertexes fixed by the polygon of the rough model data, and includes the object in a range of a polyhedron defined by the vertexes; and
wherein the program causes said processor to execute:
determining whether each vertex of the bounding box is included in the first field to determine whether at least a part of the object is included in the first field; and
determining whether each vertex of the bounding box is included in the second field to determine whether at least a part of the object is included in the second field.

23. The image drawing apparatus according to claim 19, wherein said data memory further stores a bounding box that is defined by a mathematical expression with reference to a typical point fixed within a range of the object and includes the object within the range defined by the mathematical expression; and
wherein the program causes said processor to execute:
determining whether at least a part of the object is included in each of the first field and the second field according to a mathematical expression that defines the bounding box and a mathematical expression that defines a boundary surface between the first field and the second field.

24. An image drawing method for drawing an object, which exists in a virtual three-dimensional space and which has rough model data that forms the object by a predetermined number of polygons and detailed model data that forms the object by more polygons than the predetermined number of polygons, by perspective-transformation onto a virtual screen from a viewpoint of a virtual camera, comprising:

dividing an image-drawing field, which is an image drawing range in the virtual three-dimensional space, into a first field and a second field with reference to a position of the viewpoint, the first field and the second field being divided at a boundary position;
determining whether at least a part of the object is included in the first field;
drawing an image obtained by perspective-transforming polygons of the rough model data of the part of the object included in the first field when at least a part of the object is included in the first field;
determining whether at least a part of the object is included in the second field;
determining whether each polygon of the detailed model data is included in the second field when at least a pad of the object is included in the second field; and
drawing an image obtained by perspective-transforming the polygons of the detailed model data of the part of the object included in the second field.

25. A computer-readable storage medium comprising a program for drawing an object, which exists in a virtual three-dimensional space and which includes rough model data that forms the object by a predetermined number of polygons and detailed model data that forms the object by more polygons than the predetermined number of polygons, by perspective-transformation onto a virtual screen from a viewpoint of a virtual camera,
wherein the program causes a computer apparatus to execute:
dividing an image-drawing field, which is an image drawing range in the virtual three-dimensional space, into a first field and a second field with reference to a position of the viewpoint, the first field and the second field being divided at a boundary position;
determining whether at least a part of the object is included in the first field;
drawing an image obtained by perspective-transforming polygons of the rough model data of the part of the object included in the first field when at least a part of the object is included in the first field;
determining whether at least a part of the object is included in the second field;
determining whether each polygon of the detailed model data is included in the second field when at least a part of the object is included in the second field; and
drawing an image obtained by perspective-transforming the polygons of the detailed model data of the part of the object included in time second field.

* * * * *